United States Patent
Sri et al.

(10) Patent No.: US 10,467,854 B2
(45) Date of Patent: Nov. 5, 2019

(54) METHOD AND APPARATUS FOR ENGAGING USERS ON ENTERPRISE INTERACTION CHANNELS

(71) Applicant: [24]7.ai, Inc., San Jose, CA (US)

(72) Inventors: R. Mathangi Sri, Bangalore (IN); Bhupinder Singh, Bangalore (IN)

(73) Assignee: [24]7.ai, Inc., San Jose, CA (US)

( * ) Notice: Subject to any disclaimer, the term of this patent is extended or adjusted under 35 U.S.C. 154(b) by 216 days.

(21) Appl. No.: 15/429,124

(22) Filed: Feb. 9, 2017

(65) Prior Publication Data
US 2017/0154495 A1  Jun. 1, 2017

Related U.S. Application Data

(63) Continuation-in-part of application No. 14/142,698, filed on Dec. 27, 2013, now Pat. No. 9,600,828.

(60) Provisional application No. 61/751,141, filed on Jan. 10, 2013.

(51) Int. Cl.
| | | |
|---|---|---|
| *G07F 17/32* | (2006.01) | |
| *G06F 3/0484* | (2013.01) | |
| *G06Q 30/02* | (2012.01) | |
| *G06Q 10/10* | (2012.01) | |
| *G06Q 30/06* | (2012.01) | |

(52) U.S. Cl.
CPC ...... *G07F 17/3244* (2013.01); *G06F 3/04842* (2013.01); *G06Q 10/107* (2013.01); *G06Q 30/02* (2013.01); *G06Q 30/0201* (2013.01); *G06Q 30/0241* (2013.01); *G06Q 30/0255* (2013.01); *G06Q 30/0269* (2013.01); *G06Q 30/06* (2013.01); *G07F 17/3255* (2013.01); *G07F 17/3262* (2013.01); *G07F 17/3269* (2013.01)

(58) Field of Classification Search
CPC .......................................... G06Q 10/00–50/00
USPC ................................................ 705/7.11–7.42
See application file for complete search history.

(56) References Cited

U.S. PATENT DOCUMENTS

| | | | |
|---|---|---|---|
| 7,945,473 B2 | 5/2011 | Cumby et al. | |
| 8,775,332 B1* | 7/2014 | Morris | G06N 20/00 706/11 |
| 8,914,285 B2 | 12/2014 | Pollak et al. | |
| 9,311,914 B2* | 4/2016 | Wasserblat | G10L 15/02 |

(Continued)

FOREIGN PATENT DOCUMENTS

CA    2453861    1/2003

OTHER PUBLICATIONS

Canadian Office Action dated May 14, 2018, which issued during prosecution of Canadian Application No. 2,897,077.

(Continued)

*Primary Examiner* — Alan S Miller
(74) *Attorney, Agent, or Firm* — Perkins Coie LLP; Michael A. Glenn

(57) ABSTRACT

A computer-implemented method and an apparatus facilitate user engagement on enterprise interaction channels. Information related to a current journey of a user on one or more enterprise interaction channels is received. The user is categorized as one of a hot lead, a warm lead, and a non-hot lead based, at least in part, based on the received information related to the current journey of the user. If the user is categorized as the non-hot lead, a user interface (UI) displayed to the user is modified. The UI is modified to facilitate user engagement for converting the user from a non-purchasing entity to a purchasing entity.

26 Claims, 12 Drawing Sheets

(56) References Cited

U.S. PATENT DOCUMENTS

| | | | |
|---|---|---|---|
| 2002/0082923 A1* | 6/2002 | Merriman | G06Q 30/0222 705/14.23 |
| 2004/0162724 A1* | 8/2004 | Hill | G10L 15/1822 704/231 |
| 2005/0105712 A1 | 5/2005 | Williams et al. | |
| 2005/0189415 A1* | 9/2005 | Fano | G06N 20/00 235/383 |
| 2006/0265090 A1 | 11/2006 | Conway et al. | |
| 2008/0077462 A1* | 3/2008 | Patel | G06Q 20/108 705/7.33 |
| 2008/0086402 A1 | 4/2008 | Patel et al. | |
| 2008/0162268 A1* | 7/2008 | Gilbert | G06Q 10/06375 705/7.29 |
| 2008/0177600 A1* | 7/2008 | McCarthy | G06Q 10/0639 705/7.33 |
| 2009/0012826 A1* | 1/2009 | Eilam | G06Q 30/02 705/7.31 |
| 2009/0119161 A1* | 5/2009 | Woda | G06Q 10/00 705/7.29 |
| 2010/0049679 A1* | 2/2010 | Phillips | G06Q 30/02 706/15 |
| 2011/0125793 A1* | 5/2011 | Erhart | G06Q 30/02 707/776 |
| 2011/0238410 A1* | 9/2011 | Larcheveque | G06F 17/2785 704/9 |
| 2011/0243311 A1* | 10/2011 | Aldrich | H04M 3/2281 379/88.14 |
| 2012/0076283 A1* | 3/2012 | Ajmera | G06Q 10/10 379/93.17 |
| 2013/0073387 A1* | 3/2013 | Heath | G06Q 50/01 705/14.53 |
| 2013/0073473 A1* | 3/2013 | Heath | G06Q 30/02 705/319 |
| 2013/0282430 A1* | 10/2013 | Kannan | G06Q 30/02 705/7.29 |
| 2013/0325530 A1* | 12/2013 | Pal | G06Q 30/0204 705/7.11 |
| 2014/0025376 A1* | 1/2014 | Wasserblat | G10L 25/51 704/238 |
| 2014/0195562 A1* | 7/2014 | Hardeniya | G06Q 30/0256 707/776 |
| 2014/0195979 A1* | 7/2014 | Branton | G06F 3/0488 715/834 |

OTHER PUBLICATIONS

Boorom, Michael L. et al., "Relational Communication Traits and Their Effect on Adaptiveness and Sales Perormance", Journal of the Academy of Marketing Science, Winter 1998, pp. 16-30.

Takeuchi, Hironori et al., "Automatic Identification of Important Segments and Expressions for Mining of Business-Oriented Conversations at Contact Centers", Proceedings of the 2007 Joint Conference on Empirical Methods in Natural Language Processing and Computational Natural Language Learning, Jun. 2007, pp. 458-467.

Takeuchi, Hironori et al., "Getting Insights From the Voices of Customers: Conversation Mining in a Contact Center", Information Sciences 179, www.elsevier.com/locate.ins, 2009, pp. 1584-1591.

Wikipedia entry for "Latent semantic analysis" Jun. 27, 2011, retrieved from: https://en.wikipedia.org/w/index.php?title=Latent semantic analysis&oldid=436471600.

Wikipedia entry for "Latent Dirichlet allocation" Sep. 13, 2007, retrieved from: https://en.wikipedia.orq/w/index.php?title=Latent Dirichlet allocation&oldid=15759034.

\* cited by examiner

METHOD AND APPARATUS FOR ENGAGING USERS ON ENTERPRISE INTERACTION CHANNELS

CROSS REFERENCE TO RELATED APPLICATIONS

This application is a continuation-in-part of non-provisional patent application Ser. No. 14/142,698, filed Dec. 27, 2013, which claims priority to U.S. provisional patent application Ser. No. 61/751,141, filed Jan. 10, 2013, which applications are incorporated herein in their entirety by this reference thereto.

TECHNICAL FIELD

The present invention relates to engaging with users in a sales environment, and more particularly, to a method and apparatus for engaging with users on enterprise interaction channels.

BACKGROUND

Users typically visit enterprise interaction channels, such as an enterprise Website for example, to buy a good or a service, to learn about new good or service offerings, to troubleshoot a product, to lodge a complaint, and the like. Most enterprises, nowadays, track user actions on the enterprise interaction channels. For example, if a user is interacting with an interactive voice response (IVR) system for resolving a query, then the nature of the query, whether the query was resolved or not, and many such attributes may be tracked by the enterprise.

In a sales scenario, the tracked attributes corresponding to user actions on the enterprise interaction channels are typically provided as an input to a binary classifier to predict whether the user will purchase a good or a service or not. If the user is predicted to make a purchase transaction, then the user is classified as a hot lead, and if the user is predicted not to make a purchase transaction then the user is classified as a non-hot lead.

Typically, the users who are classified as hot leads are proactively targeted during their current journey on the enterprise interaction channels, whereas the non-hot leads are largely ignored or are targeted only if the resources are available after engaging with the hot leads. In an example scenario, a button chat may be displayed on an enterprise Website to a user categorized as a non-hot lead. The chat-based assistance may, in such a scenario, only be available to the user if the user seeks assistance by clicking or selecting the button chat option.

Generally, user categorization as a hot lead or a non-hot lead is performed using stringently applied boundaries and, as such, many users whose activity on the enterprise interaction channels may not be captured accurately or for whom sufficient data is not available for categorization purposes, are classified as a non-hot leads, and thereby ignored.

Accordingly, there is a need to drive more opportunity for sales by categorizing users in alternate ways. There is also a need to engage proactively with the non-hot leads because the non-hot leads constitute a substantially higher percentage of the overall pool of users, and although they are least likely to buy, they may still be proactively engaged on the enterprise interaction channels to drive up sales for an enterprise.

SUMMARY

In an embodiment of the invention, a computer-implemented method for engaging with users on enterprise interaction channels is disclosed. The method receives, by an interaction engine of an apparatus, information related to a current journey of a user on one or more enterprise interaction channels. The method categorizes the user as one of a hot lead, a warm lead, and a non-hot lead by an analysis engine of the apparatus. The categorization is performed, at least in part, based on the received information related to the current journey of the user. If the user is categorized as the non-hot lead, the method modifies a user interface (UI) displayed to the user by the interaction engine. The UI is displayed to the user on at least one enterprise interaction channel from among the one or more enterprise interaction channels. The UI is modified to facilitate user engagement for converting the user from a non-purchasing entity to a purchasing entity.

In another embodiment of the invention, an apparatus for engaging with users on enterprise interaction channels is disclosed. The apparatus includes an interaction engine and an analysis engine. The interaction engine is configured to receive information related to a current journey of a user on one or more enterprise interaction channels. The analysis engine is communicably associated with the interaction engine and is configured to categorize the user as one of a hot lead, a warm lead, and a non-hot lead. The categorization is performed, at least in part, based on the received information related to the current journey of the user, wherein if the user is categorized as the non-hot lead, the interaction engine is configured to modify a user interface (UI) displayed to the user on at least one enterprise interaction channel from among the one or more enterprise interaction channels. The UI is modified to facilitate user engagement for converting the user from a non-purchasing entity to a purchasing entity.

In another embodiment of the invention, a computer-implemented method for engaging with users on enterprise interaction channels is disclosed. The method analyzes, by an analysis engine of an apparatus, transcripts of interactions between users and agents associated with an enterprise. The interactions are facilitated using an interaction engine of the apparatus. The method categorizes, by the analysis engine, each user as one of a hot lead, a warm lead, or a non-hot lead based on the analysis of a respective interaction transcript. The method identifies correlation between user journeys on enterprise interaction channels and categorization of corresponding users as hot leads, warm leads, or the non-hot leads. The method receives, by the interaction engine, information related to a current journey of a user on one or more enterprise interaction channels. The method categorizes the user as one of a hot lead, a warm lead, and a non-hot lead by the analysis engine. The categorization is performed based on the received information related to the current journey and the identified correlation. If the user is categorized as the non-hot lead, the method modifies a user interface (UI) displayed to the user by the interaction engine. The UI is displayed to the user on at least one enterprise interaction channel from among the one or more enterprise interaction channels. The UI is modified to facilitate user engagement for converting the user from a non-purchasing entity to a purchasing entity.

DETAILED DESCRIPTION

Figure 1:
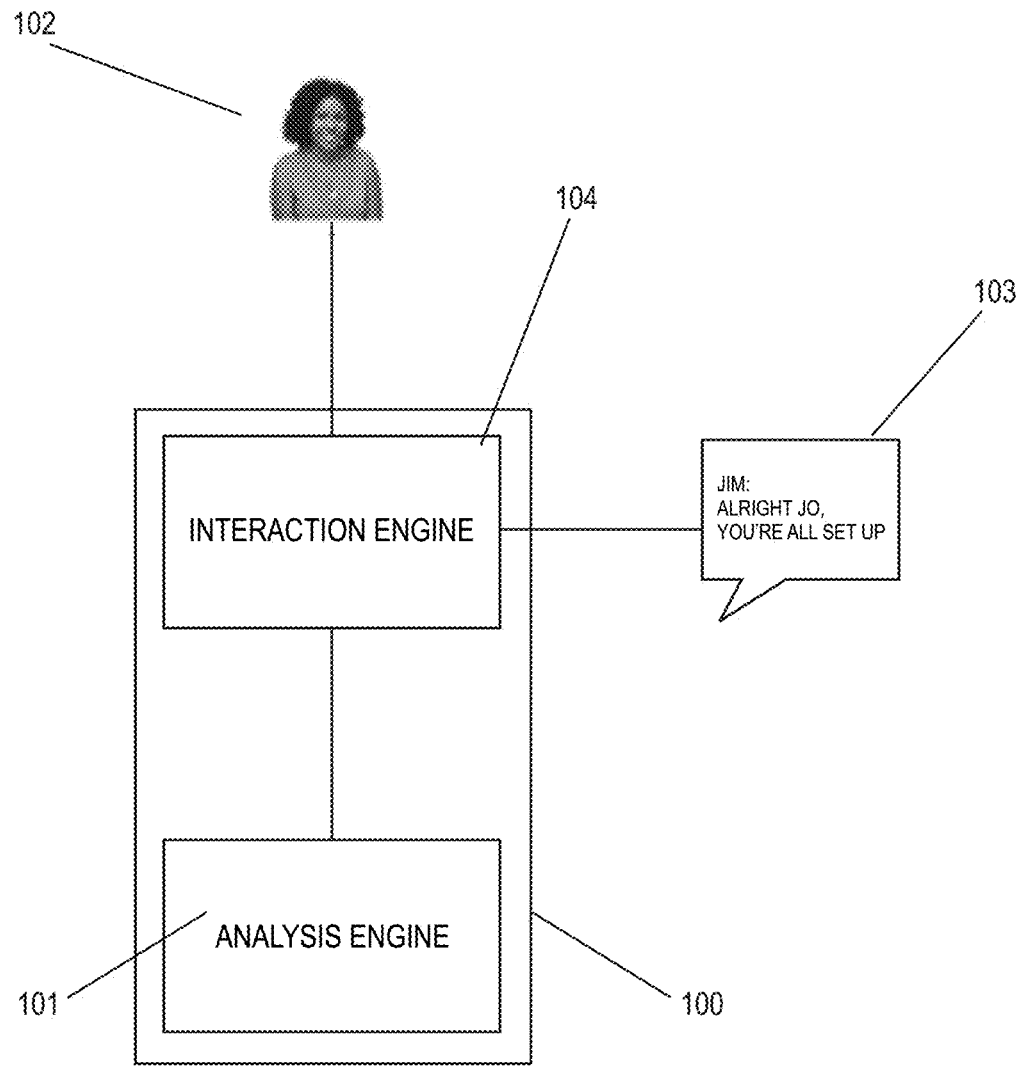
FIG. 1 is a block schematic diagram that shows an apparatus, in accordance with an embodiment of the invention.

The detailed description provided below in connection with the appended drawings is intended as a description of embodiments of the invention and is not intended to represent the only forms in which the invention may be constructed or used. However, the same or equivalent functions and sequences may be accomplished by different embodiments.

Users of enterprise goods, services, and/or information routinely visit enterprise interaction channels, such as enterprise Website, native mobile application, social media Web pages, etc. to purchase goods and/or services, to learn about new product offerings, to troubleshoot a product feature, and the like.

Most enterprises, nowadays, capture user activity on enterprise interaction channels and use the captured information to predict whether the user will make a purchase transaction during the current visit to the enterprise interaction channel or not. If the prediction for the user suggests that the user is likely to purchase a good or a service, then the user is categorized as a hot lead and the user is treated preferentially. If the prediction for the user suggests that the user is not likely to purchase a good or a service, then the user may not be proactively engaged and is generally provided assistance only when the user seeks assistance. For example, the user may be provided chat-based agent assistance if the user clicks on the button chat option displayed on the enterprise Website.

In some embodiments of the invention, users may engage in interactions with customer support agents. Typical interactions include inquiries about a good or service and a service call. When the user purchases a good or service, or successfully completes a service call, the user is said to have converted, i.e. the sales pitch or service solution was successful. If the customer does not convert, then the interaction between user and agent may be analyzed to determine why the user did not convert, and whether the user should be categorized as a near convert for potential retargeting. The users categorized as near converts are treated as hot leads and preferentially treated during their subsequent visit to the enterprise interaction channels. If the user is determined to be not likely to convert based on the analysis of the interaction between the user and the agent, then the user may be categorized as a non-hot lead.

Generally, user categorization as a hot lead or a non-hot lead is performed using stringently applied boundaries and, as such, many users whose activity on the enterprise interaction channels may not be captured accurately or for whom sufficient data is not available for categorization purposes, are classified as a non-hot leads, and thereby ignored. There is also a need to engage proactively with the non-hot leads because the non-hot leads constitute a substantially higher percentage of the overall pool of users, and although they are least likely to buy, they may still be proactively engaged on the enterprise interaction channels to drive up the sales.

Various embodiments of the invention suggest categorizing the pool of users into hot leads, warm leads, and non-hot leads using fuzzy logic to drive more opportunity for sales. Further, embodiments disclosed herein suggest techniques for proactively engaging with the non-hot leads to drive up the sales. The engagement of hot leads (for example, near converts) is explained with reference to FIGS. 1 to 7. The engagement of warm leads and non-hot leads is thereafter explained with reference to FIGS. 8 to 14.

FIG. 1 is a block schematic diagram that shows an apparatus 100 for tracking near conversions in user engagements, in accordance with an embodiment of the invention. Embodiments of the invention that are discussed herein concern user management in a sales and/or service environment, although those skilled in the art will appreciate that the invention has other applications. The apparatus 100 shown in FIG. 1 includes an analysis engine 101 and an interaction engine 104. A user 102 and an agent 103 access the interaction engine 104 and interact with each other using the interaction engine 104. The interaction engine 104 uses any available channel, such as chat, telephone, or a combination of chat and telephone as the mode of interaction.

Once an agent 103 has finished interacting with a user 102, the user 102 is categorized into a converted user or a non-converted user. For purposes of the discussion herein, the converted user is defined as a user 102 with whom the agent 103 has been able to complete the transaction, where the transaction can be any of, for example, a sales transaction, resolution of service query, etc. For purposes of the discussion herein, the non-converted user is defined as a user 102 with whom the agent 103 was unable to complete the conversion. The users can be appropriately flagged by the agent 103 or by the analysis engine 101.

In embodiments of the invention, the analysis engine 101 accesses the transcripts of the interaction between the agent 103 and the non-converted user 102 in a textual format. If the interaction between the agent 103 and the non-converted user 102 includes a voice based interaction, e.g. over the telephone, Internet, or any other suitable channel, then a suitable mechanism is included for transcribing the interaction into textual format.

The analysis engine 101 analyzes the transcripts and, on the basis of this analysis, identifies near converted users. For purposes of the discussion herein, near converted users are those non-converted users who have a high probability of being converted. Near converted users may be re-targeted through various channels of interaction including, for example, an offline campaign, e.g. an email campaign. The analysis engine 101 can also use such analysis to target future users.

In another embodiment of the invention, the analysis engine 101 also analyzes the journeys of a sample set of users who have visited the sales and/or service environment. The sample set of users includes converted users, non-converted users, and users who have been designated as near converted users. Based on the analysis, the analysis engine 101 builds a model that creates a correlation between the journeys, interactions, and the type of user, e.g. converted/non-converted. In an offline process, all interactions are processed and potential near converts are predicted using the method prescribed herein and their identity is stored in the database, for example through the use of one or more cookies. When the analysis engine 101 detects a user interacting with the online sales environment, a CRM dip is performed to determine if this user was a potential near convert in the past. If so, the user is offered a different visitor experience based on what was discussed in the user's previous interaction. The analysis engine 101 then modifies the visitor experience, such that the user may become a converted user. The modification may be in the form of introducing a mode for an agent to interact with the user, such as a chat window, a re-arrangement of the menu options, and any other suitable modification.

Figure 2:
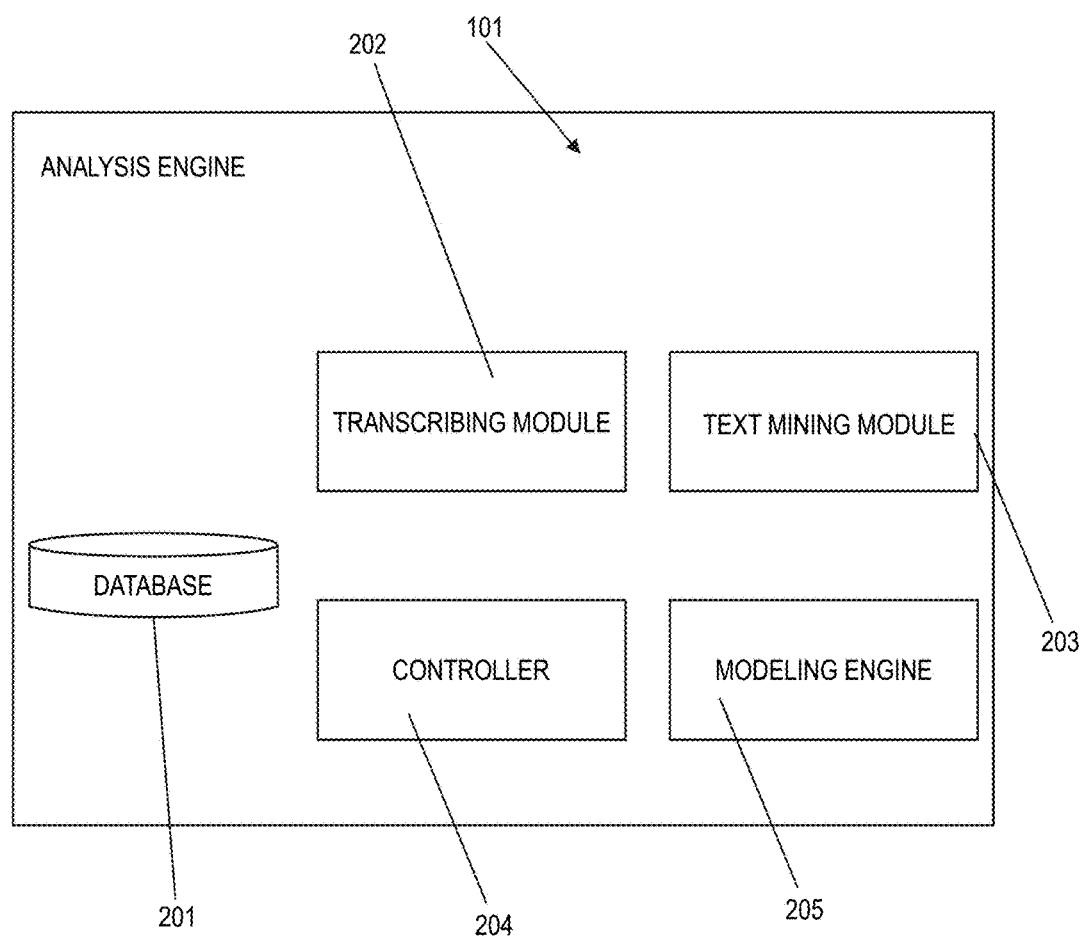
FIG. 2 is a block schematic diagram that shows an analysis engine, in accordance with an embodiment of the invention.

FIG. 2 is a block schematic diagram that shows the analysis engine 101, in accordance with an embodiment of the invention. In embodiments of the invention, the analysis engine 101 includes a database 201, a transcribing module 202, a text mining module 203, a controller 204, and a modeling engine 205. The controller 204 receives transcripts of agent interactions with the non-converted user 102 from the interaction engine 104. The transcripts are received by the controller 204 from the transcribing module 202, which transcribes voice interactions between the user 102 and the agent 103. In another embodiment of the invention, the controller 204 sends the transcript to the text mining module 203.

Figure 3:
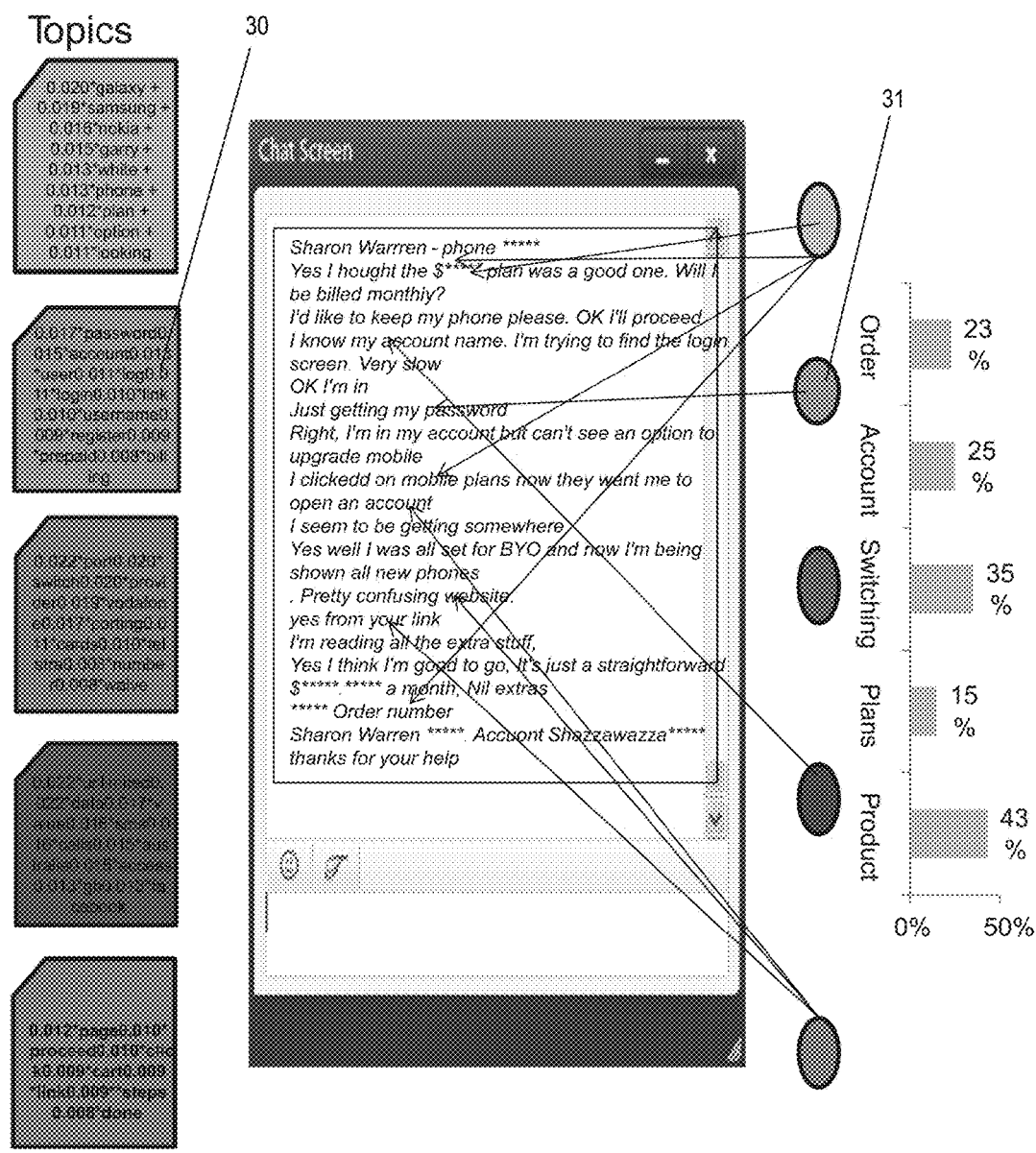
FIG. 3 is a chat screen showing a sample chat represented as a distribution of topics, in accordance with an embodiment of the invention.

Initially, the text mining module 203 performs topic modeling, i.e. a process that identifies relevant latent topics in a text corpus, to represent transcripts in terms of a set of N topics, where the value for N is chosen appropriately by experimentation. For purposes of the discussion herein, a topic is a distribution over the vocabulary, i.e. all words in the transcripts. This is shown in FIG. 3, which is a chat screen showing a sample chat represented as a distribution of topics in accordance with an embodiment of the invention. All of the topics identified over the corpus are shown on the left side of FIG. 3. Each topic shown is a mixture of the words with each word weighted according to its importance in that topic. For example, one can easily look at the second topic number 30 and connect it with 'account related issues' 31. A chat is represented as a set of such topics in FIG. 3.

The text mining module 203 analyzes the transcripts of interactions over a period of time to obtain a topic model comprising N topics. The text mining module 203 uses a model such as, for example, Latent Semantic Indexing (LSI), Probabilistic LSI (PLSI), or Latent Dirichlet Allocation (LDA) to identify the topics that are present in the transcript. The controller 204 builds a probabilistic binary classifier, for example a logistic regression, in which sales conversion is a response variable, and in which the topics received from the text mining module are independent variables, and then determines weights for each of the topics.

$$\text{Probability(Sale)} = f(\text{topic}1, \ldots, \text{topic}N) \quad (1)$$

where the Probability of a Sale happening in a chat is modeled as a function of the topics identified for that chat.

On receiving a transcript, the text mining module 203 analyzes the transcript and identifies the topics that are present in the transcript. In embodiments of the invention, the text mining module 203 uses a model such as, for example, Latent Semantic Indexing (LSI), Probabilistic LSI (PLSI), and Latent Dirichlet Allocation (LDA) to identify the topics that are present in the transcript. The text mining module 203 identifies purchase and/or sale information that corresponds to the transcript by examining the disposition of the agent associated with the transcript. In embodiments of the invention, the disposition of the agent includes such information as sale information in the transcript that indicates whether or not a sale was made. Such disposition is filled by the agent after the chat is over. For embodiments of the invention within the IVR domain, the IVR call is converted to text. The sale information for an IVR call is obtained by tracking the IVR journey. Sale information is logged as an IVR event, which is used for creating a training sample. Similarly, for Web journeys, the sale information is tracked in the journey.

Based on the identified topics present in the transcript, the controller 204 scores the transcript. Here, the score is the probability of a sale convert. Hence, the score is between 0.0 and 1.0, inclusive, where the higher the probability, more chances are that this interaction was almost a convert, i.e. a near convert. Based on the score, the controller 204 classifies the transcripts as near convert users. In an embodiment of the invention, the controller 204 classifies transcripts having a high score as those related to a near converted user, whereas transcripts having a low score are classified as these related to users with a low chance of being converted. In embodiments of the invention, the threshold for deciding if a user is near converted user may also be decided by an authorized person or through active learning. In the case of retargeting by email campaigns, thresholding can also be appropriately determined based on the number of users that need to be targeted.

Near Convert Analysis

Figure 4:
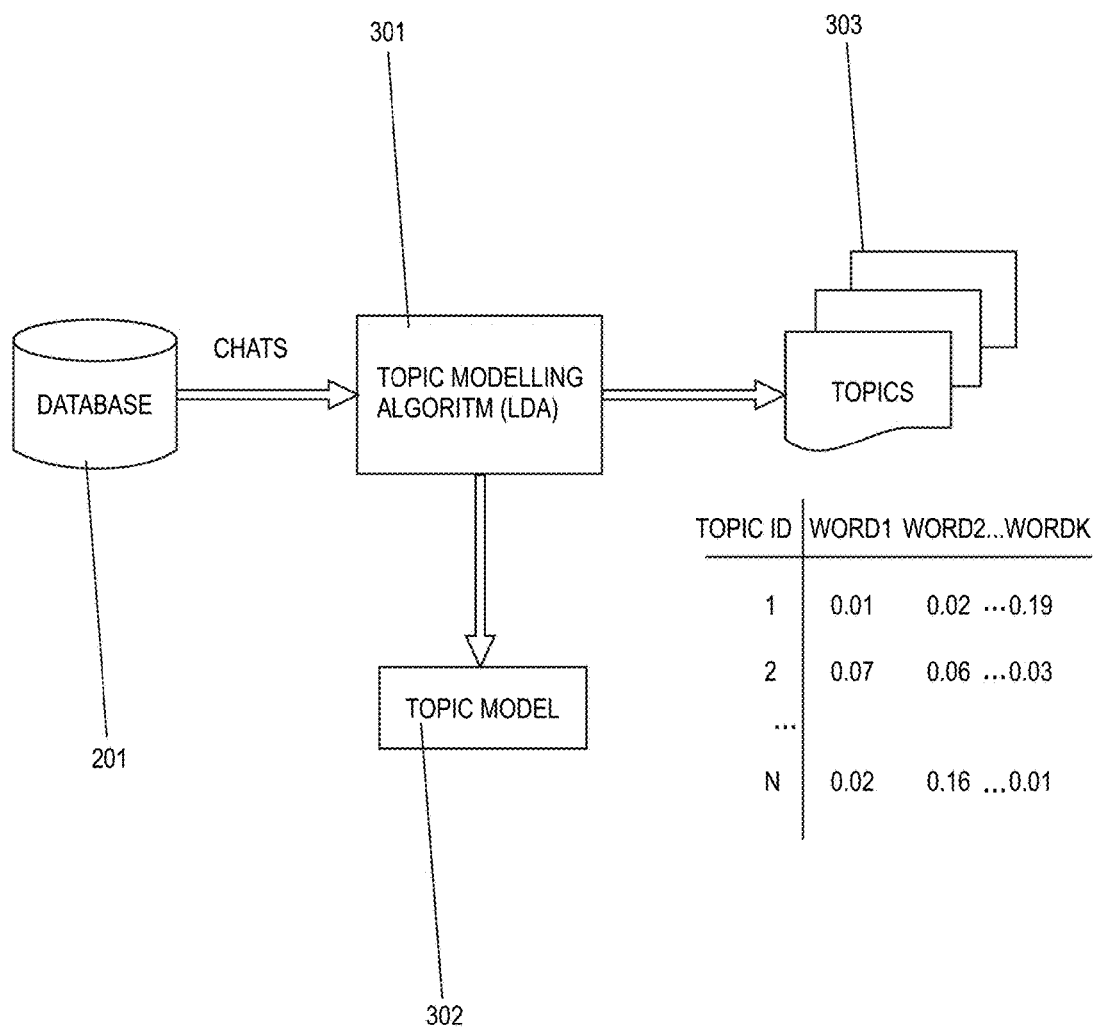
FIG. 4 is a block schematic diagram that shows the training of a topic model, in accordance with an embodiment of the invention.

FIG. 4 is a block schematic diagram that shows the training of a topic model in accordance with an embodiment of the invention. A topical distribution of text chats is learned by training a topic modeling algorithm (LDA—Latent Dirichlet Allocation) 301 on a dataset of chats in the database 201. Each topic, e.g. identified as Topic ID 1-N, is a distribution over all the words in the chat corpus, e.g. WORD1-WORDK, also referred to herein as the vocabulary of the corpus. As a result, a set of the topics present in the chat corpus 303 and a topic model 302 is produced, which then can be used to identify topic distribution in new chat texts.

Figure 5:
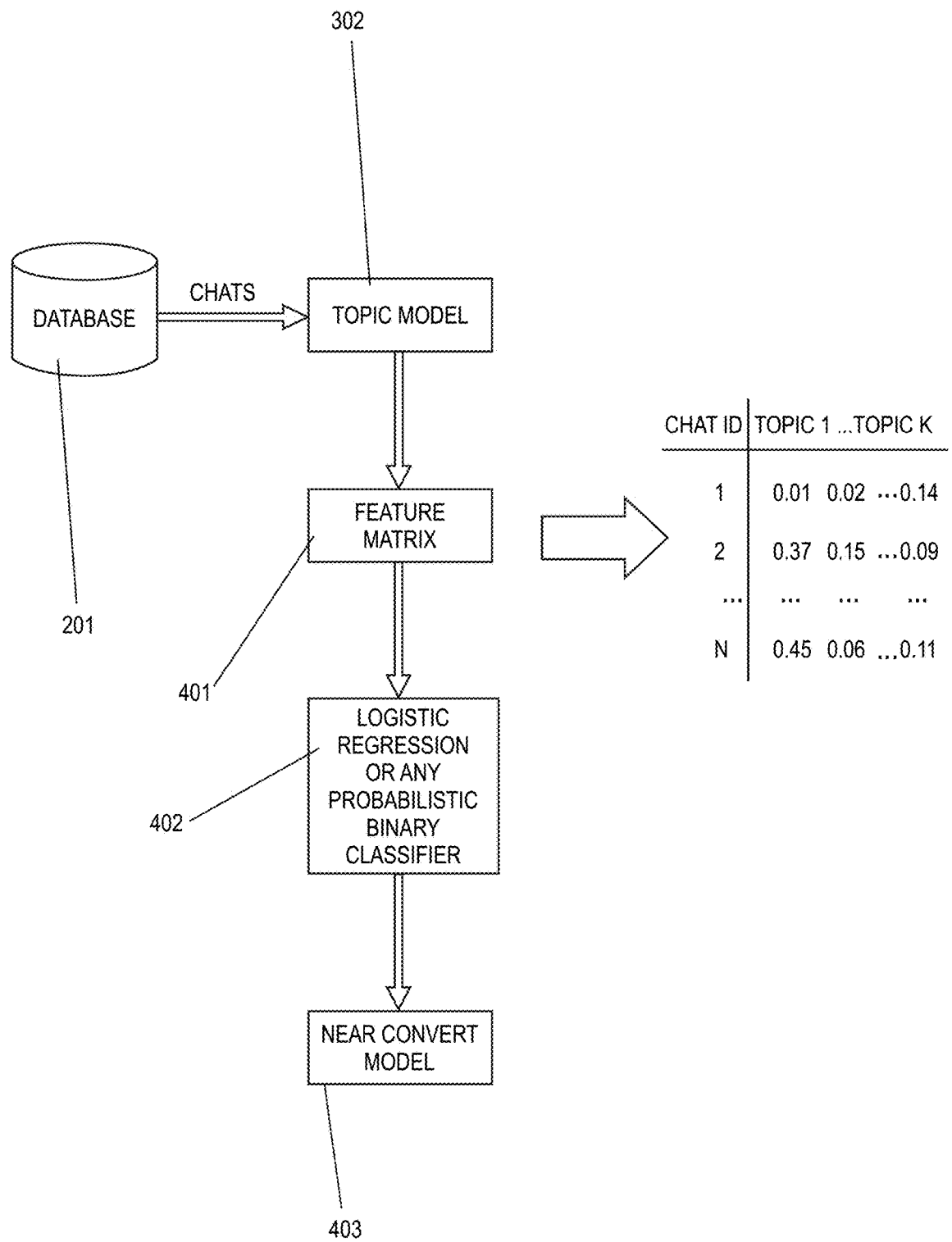
FIG. 5 is a block schematic diagram that shows the training of a logistic regression for sale prediction, in accordance with an embodiment of the invention.

FIG. 5 is a block schematic diagram that shows the training of a probabilistic binary classifier, e.g. logistic regression for sale prediction, according to the invention. A set of text chats is fetched from the database 201 along with sales response information. After end of each chat, call center agents indicate whether the sale was successful or not. Every chat is represented as a topic distribution 302, which forms feature matrix 401 for training. See, for example, the probability distributions for TOPIC1-TOPICK as shown in FIG. 5 against each of Chat ID 1-N. A logistic regression model 402, or any other probabilistic binary classifier, is trained on the feature matrix using sales information as a response, and a near convert model 403 is thus produced. A logistic regression is model that learns the mappings from the given topic distribution of the chat to its given sale response. Whenever a new non-converted chat of a user is given, the regression model associates a probability of sale, i.e. a score, to this new chat. This probability is then used to determine if the given user was a potential near convert.

Figure 6:
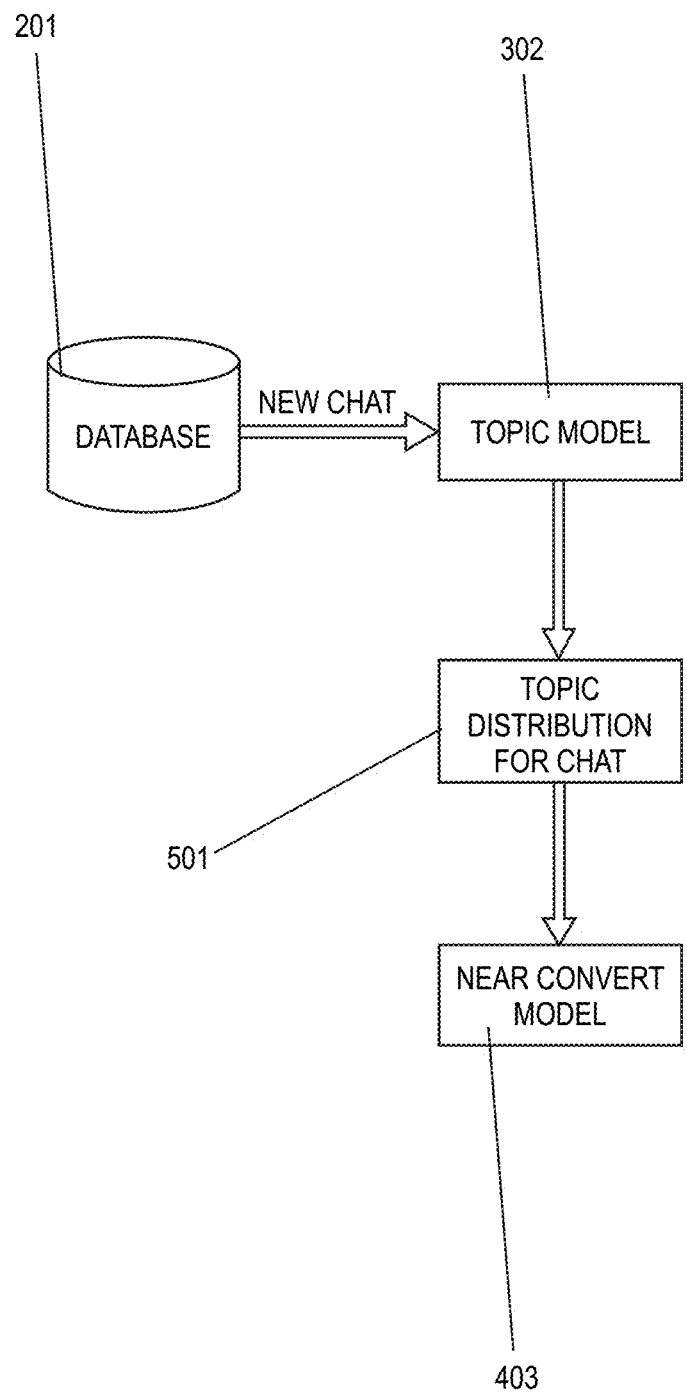
FIG. 6 is a block schematic diagram that shows the predicting of near-sale-converts based upon new text chats, in accordance with an embodiment of the invention.

FIG. 6 is a block schematic diagram that shows the predicting of near sale converts based upon new text chats in accordance with an embodiment of the invention. Every new chat which was non-convert, i.e. where a sale did not occur, is represented as a distribution of topics 501 using the topic model 302 and is classified by the near convert model 403. This process of topical representation is illustrated with an example in the FIG. 3. The near convert model 403 outputs the sale probability S given the chat. If the value of S is above a predetermined threshold T, then this chat is identified as a near convert. The threshold is determined by the number of near converts that are needed for retargeting. If the number of users to be retargeted is relatively high, then a threshold that is quite lower can be chosen. On the contrary, if the number is low, as in the case where it is desired that the probability of the near convert be as high as possible, the threshold can be set very high, e.g. >0.6.

Method for Identifying Near-Converted Users

Figure 7:
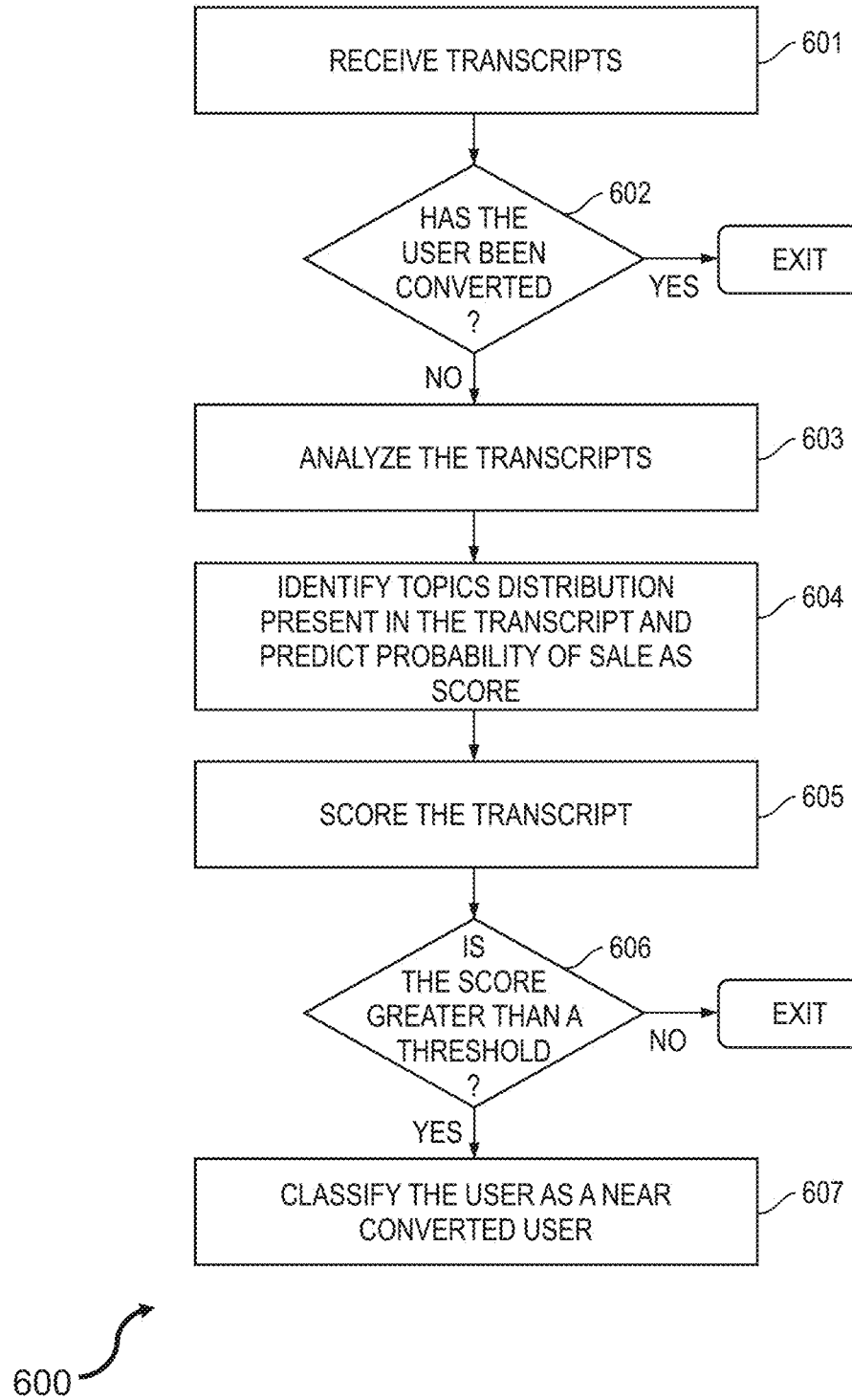
FIG. 7 is a flow diagram that shows a method for identifying a user as a near-converted user, in accordance with an embodiment of the invention.

FIG. 7 is a flow diagram that shows a method (600) for identifying a user as a near-converted user in accordance with an embodiment of the invention. In FIG. 7, a user is identified as a near converted user and a suitable campaign is then planned for such near converted users. The analysis engine 101 receives (601) the transcripts from the interaction engine 104. If the transcripts are received by the analysis engine 101 in a voice format they are transcribed by the analysis engine 101.

The analysis engine 101 checks (602) if the user corresponding to the transcript has been converted, for example by checking the information present in the disposition of the agent responsible for the interaction. If the user has not been converted, the analysis engine 101 analyzes (603) the transcripts and identifies (604) the topics present in the transcript using the topic model that was built before in the corpus. This process is illustrated in FIG. 3. Based on the topics present in the transcript, the analysis engine 101 scores (605) the transcript.

The analysis engine 101 also checks (606) if the score is above a predetermined threshold. In embodiments of the invention, the threshold for deciding if a user is near converted user may be decided by an authorized person. Further, the threshold can be readjusted based on the users, who were retargeted by active learning. Active learning takes the feedback of the user at run time, e.g. how did the user react to a contextual invite or retarget, and incorporates the same to tune the model and/or threshold. If the score is above a threshold, the analysis engine 101 classifies (607) the user corresponding to the transcript as a near converted user.

The various actions shown in FIG. 7 may be performed in the order presented, in a different order or simultaneously. Further, in some embodiments of the invention, some of the actions shown in FIG. 7 may be omitted.

In another embodiment of the invention, users who have had no interaction with an agent previously, but who have undertaken a journey on an enterprise interaction channel, such as by navigating across a Web site, are also classified as near converted users, based on their journey. More specifically, the identification of near converts, i.e. hot leads, may be performed in some scenarios based on the previous interactions of the users with the agents of the enterprise (as explained above), and, in some example embodiments, the identification of near converts or hot leads may be performed by tracking user activity on the enterprise interaction channels, as will be explained hereinafter.

In at least one example embodiment, the interaction engine 104 of the apparatus 100 (shown in FIG. 1) may be configured to receive information related to a current journey of a user on one or more enterprise interaction channels. For example, for a current journey of a user on an enterprise Website, the information received related to the current journey may include information such as Web pages visited, time spent on each Web page, time spent on the Website so far, operating system (OS) of the device used for accessing the Website, browser of the device used for accessing the Website, menu options accessed, drop-down options selected or clicked, mouse movements, hypertext mark-up language (HTML) links those which are clicked and those which are not clicked, focus events (for example, events during which the user has focused on a link/Webpage for a more than a pre-determined amount of time), non-focus events (for example, choices the user did not make from information presented to the user (for examples, products not selected) or non-viewed content derived from scroll history of the visitor), touch events (for example, events involving a touch gesture on a touch-sensitive device such as a tablet), non-touch events, and the like. It is understood that an enterprise may associate tags, such as HTML tags or JavaScript tags with the various elements of the Website, which may be invoked when the user clicks or selects a corresponding element on the enterprise Website. Alternatively, the enterprise may open up a socket connection to capture information related to user activity on its Website. In at least one example embodiment, the interaction engine 104 may be communicably associated with Web servers hosting Web pages of the enterprise Website to receive such information related to the current journey of users, in substantially real-time.

In another illustrative example, a user may use a chat interaction channel, i.e., engage in a chat interaction with an agent of the enterprise. For such a journey of the user on the chat interaction channel, the information received may include conversational content related to the chat conversation including information such as a type of user concern, which agent handled the chat interaction, user concern resolution status, time involved in the chat interaction, and the like, may be captured as interaction data. The interaction engine 104 may be communicably associated with one or more servers deployed at a customer support facility to receive interaction data related to user voice conversations and chat conversations with various agents of the enterprise.

In some example scenarios, the user's current journey may encompass multiple electronic devices and two or more enterprise interaction channels. For example, a user may initiate an interaction with the enterprise by browsing an enterprise Website on a tablet device, and thereafter engage in a voice call conversation with a human agent using a smartphone. As such, the user's current journey may encompass two or more interaction channels and two or more electronic devices. Accordingly, the information received corresponding to the user's current journey may include information from all enterprise interaction channels and electronic devices used by the user for interacting with the enterprise.

In at least one example embodiment, the analysis engine 101 may be configured to receive the information related to the current journey of the user from the interaction engine 104. The analysis engine 101 may further be configured to categorize the user as one of a hot lead, a warm lead, and a non-hot lead based, at least in part, on the received information related to the current journey of the user. More specifically, in some embodiments, each user may be categorized as a hot lead, a warm lead, or a non-hot lead based on the received information related to the respective current journeys, whereas, in at least one example embodiment, each user may be categorized as one of the hot lead, warm lead, or the non-hot lead based on the received information, as well as a pre-identified correlation between user categorizations and respective user journeys, as will be explained later. The categorization of users is explained in further detail below.

In an embodiment, to perform the categorization, the analysis engine 101 may be configured to predict the intention of the user. The intention of the user may be predicted using the received information related to the current journey and any previous journeys of the user on the one or more enterprise interaction channels. More specifically, for user intention prediction purposes, the analysis engine 101 may be configured to subject received information related to the current journey and any previous journeys to a set of structured and un-structured data analytical models including text mining and predictive models (hereinafter collectively referred to as prediction models). In an embodiment, prior to subjecting the information to the prediction models, the received information may be appropriately transformed into variables by the analysis engine 101. In an embodiment, the information may be transformed to generate a plurality of features (or feature vectors), which may then be provisioned to the prediction models for prediction purposes. Some examples of the features that may be provisioned to the prediction models may include, but are not limited to, any combinations of words, such as n-grams, unigrams, bigrams and trigrams, word phrases, part-of-speech of words, sentiment of words, sentiment of sentences, position of words, customer keyword searches, customer click data, user web journeys, cross-channel journeys, call-flow, user interaction history, and the like. Some examples of the prediction models may include, but are not limited to models based on Logistic regression, Naïve Bayesian, Rule Engines, Neural Networks, Decision Trees, Support Vector Machines, k-nearest neighbor, K-means, and the like.

In an embodiment, the analysis engine 101 may be configured to extract features from information associated with each user and provision the features to the prediction models. In an embodiment, the prediction models may use any combination of the above-mentioned input features to predict the user's likely intentions. In conventional user categorization mechanisms, such prediction models are embodied as binary classifiers, where the output of the prediction models are generally generated in form of binary values (1 or 0) to indicate whether the user will purchase a good or service during the current journey or not. In at least one example embodiment of the invention, the prediction may be performed using a fuzzy logic based classifier. The use of a fuzzy-logic based classifier results in generation of output from the classifier, in form of scores on a scale of 0 to 1, which further enables categorization of users into broader ranges of categories. For example, a user, whose prediction score is from 0.0 to 0.5 may be categorized as a non-hot lead, whereas a user whose prediction score is from 0.6 to 0.8 may be categorized as a warm lead, and a user whose prediction score is from 0.9 to 1 may be categorized as a hot lead. Categorization of users, by the analysis engine 101, based on such prediction scores is mentioned herein for illustration purposes and may not be considered to be limiting the scope of the invention. The logic and the output of the fuzzy logic based classifier may loosely be defined by an authorized person or may be set from machine learning of observed results. Users classified in different categories may then be treated differently (for example, preferentially or otherwise) so as to facilitate sale of a good or service, or to improve user experience of interacting on an enterprise interaction channel.

In some example scenarios, users may engage in interaction with agents associated with the enterprise during their respective journeys on the enterprise interaction channels. The interaction engine 104 of the apparatus 100 may facilitate such interactions. As explained with reference to FIGS. 1 to 7, the analysis engine 101 may be configured to analyze transcripts of interactions between the users and the agents and score the transcripts. Further, the analysis engine 101 may be configured to identify near converts, i.e. hot leads, based on the scores. A fuzzy logic based categorization, as explained above, may similarly be employed by the analysis engine 101, wherein score thresholds may be set to categorize each user as the hot lead, the warm lead or the non-hot lead, instead of identifying only the near converts. Furthermore, the analysis engine 101 may be configured to identify correlation between user journeys on enterprise interaction channels and categorization of corresponding users as hot leads, warm leads or non-hot leads. For example, if a user is categorized as a non-hot lead based on the score associated with a respective transcript, and the user performed a certain journey on the Website, then the analysis engine 101 may be configured to store the user journey along with the categorization information of the user.

Storing of user journeys along with categorization information may be performed for each user classified as a hot lead, a warm lead and a non-hot lead. The analysis engine 101 may then be configured to identify a correlation between a user journey and a categorization of a user as one of a hot lead, a warm lead, and a non-hot lead. For example, based on analyzing several Web journeys and corresponding user categorizations, the analysis engine 101 may identify a correlation between a sequence of Web page visits, for example Web page visit sequence Page 4, Page 6, Page 9, and Page 7 and the categorization of the user as a warm lead. The analysis engine 101 may be configured to store the identified correlation between the Web page visit sequence and the subsequent categorization of the user as the warm lead. Accordingly, if the received information related to a current journey of a new user to the enterprise Website suggests that the user has visited Web pages Page 4, Page 6, Page 9, and Page 7, sequentially, then the user may be classified as a warm lead. Accordingly, for each user currently present of the enterprise interaction channel, the analysis engine 101 may be configured to determine the respective current journey attributes and use the stored correlation to categorize the user as one of the hot leads, the warm lead and the non-hot lead based on the received information related to the current journey and the identified correlation.

In an embodiment, the analysis engine 101 may determine that because the warm leads are associated with a lesser likelihood of purchasing, such users may be targeted using a less intrusive proactive targeting approach than treating them as non-hot leads and passively targeting them using button chat. For example, if the user is categorized as the warm lead, the user may be targeted using offline email campaigns by the interaction engine 104 to facilitate conversion of the user from a user who is mildly interested in a good or a service into a user who actually purchases the good or service. Further, if a user is categorized as a non-hot lead, in at least one example embodiment, the interaction engine 104 may be configured to modify a user interface (UI) displayed to the user on at least one enterprise interaction channel from among the one or more enterprise interaction channels. The UI is modified to facilitate user engagement for converting the user from a non-purchasing entity (i.e. an individual not interested in engaging in a purchase or a sale transaction) to a purchasing entity (i.e. an individual interested in engaging in a purchase or a sale transaction). Although the modification of the UI is hereinafter explained with reference to engaging non-hot leads, in at least some embodiments, such modification of UIs may also be performed for warm leads to drive up sales of an enterprise.

In at least one example embodiment, modifying the UI includes causing display of summary of attributes of a good or a service most likely to be of interest to the user. For example, if a user, who is categorized as a non-hot lead, has shown some interest in a particular good or service, then a summary of attributes (i.e. summary of important features) of the good or the service may be displayed to the user on the currently being viewed UI, thereby modifying the UI.

In an embodiment, modifying the UI may include causing display of a comparison of attributes of similar goods or services most likely to be of interest to the user. For example, instead of showing interest in a particular good or service, the user may show interest in a particular type of good or service. In such a scenario, the interaction engine may be configured to display a comparison of attributes for similar type of goods or services. In an embodiment, the comparison of attributes includes comparison of market prices, comparison of sentiments associated with the goods or services, and comparison of sentiments associated with individual attributes of the goods or services. Such modification of the UI is exemplarily depicted in FIG. 8.

Figure 8:
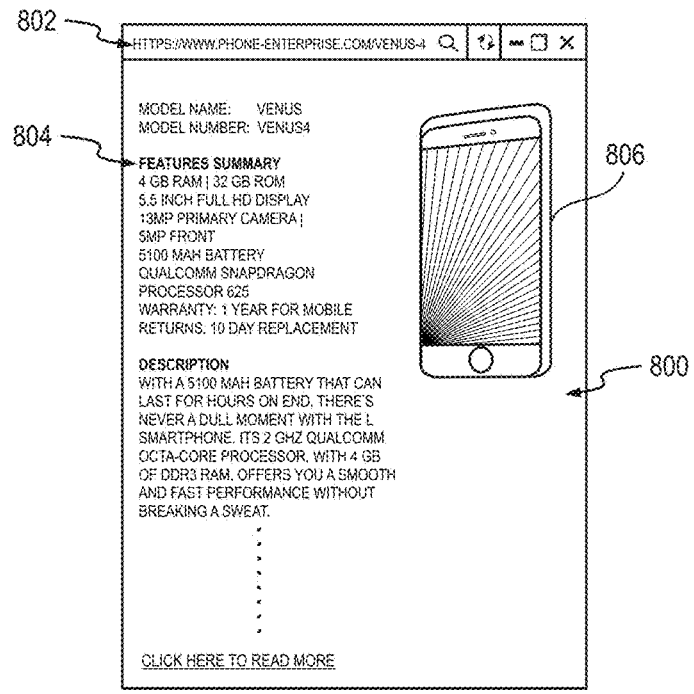
FIG. 8 shows a modified UI displayed to a user for illustrating engagement of a non-hot lead on an enterprise Website, in accordance with an example embodiment of the invention.

FIG. 8 shows a modified UI 800 displayed to a user for illustrating engagement of a non-hot lead on an enterprise Website 802, in accordance with an example embodiment of the invention. The enterprise Website 802 is depicted to be a Website of a smartphone manufacturing enterprise for illustration purposes. It is understood that the enterprise Website 802 may correspond to any Website related to a public or private enterprise. For example, the enterprise Website may relate to an e-commerce enterprise, a banking enterprise, an airline enterprise, a retail enterprise, an educational institute, and the like.

In an example scenario, the user may be browsing Web pages related to mobile phones on the enterprise Website 802. The interaction engine 104 may be configured to receive information related to such a current journey of the user in substantially real-time (i.e. with minimal delay, for example, a delay of the order of milliseconds). In at least one example embodiment, the information related to the current journey may be received in an on-going manner. In some embodiments, the information may be received at predefined time intervals, such as for example at interval of 60 seconds and the like. The analysis engine 101 of the apparatus 100 may receive the information from the interaction engine 104 and may predict an intention of the user using a fuzzy logic based classifier. The prediction may be performed as explained above, and is not explained again herein. In an example scenario, based on the prediction score, the user may be categorized as a non-hot lead. If the user is categorized as a non-hot lead, then a UI being displayed to the user on the Website 802 may be modified. For example, if the user is viewing a UI showing an image listing of several mobile phones with corresponding model numbers, then such a UI may be modified to display the UI 800 upon categorizing the user as the non-hot lead. The UI 800 is depicted to display a summary of attributes 804 of a phone model 806 in which the user may most likely be interested. For example, if the user is visiting Web pages or selecting links or clicking images of mobile phones within a particular price range or a having a particular attribute, such as a screen size for instance, then the interest of the user can be deduced and UI 800 may be configured to display the summary of attributes 804 of the phone model 806 in which the user may be most likely to be interested.

As shown, the summary of attributes 804 displayed to the user may include information such as screen size, internal and external memory size, camera capability, processor type, and the like. In an example scenario, displaying such a summary of attributes 804 may increase an interest level of the user and the user, who may initially not be inclined to make a purchase, may upon viewing the summary of attributes 804 explore more features of the phone model 806, and eventually may complete a purchase transaction during the current journey of the user on the enterprise Website 802.

In some embodiments, the interaction engine 104 may be configured to display a comparison of summary of attributes of similar goods or services most likely to be of interest to the user. Such modification of the UI is exemplarily depicted in FIG. 9.

Figure 9:
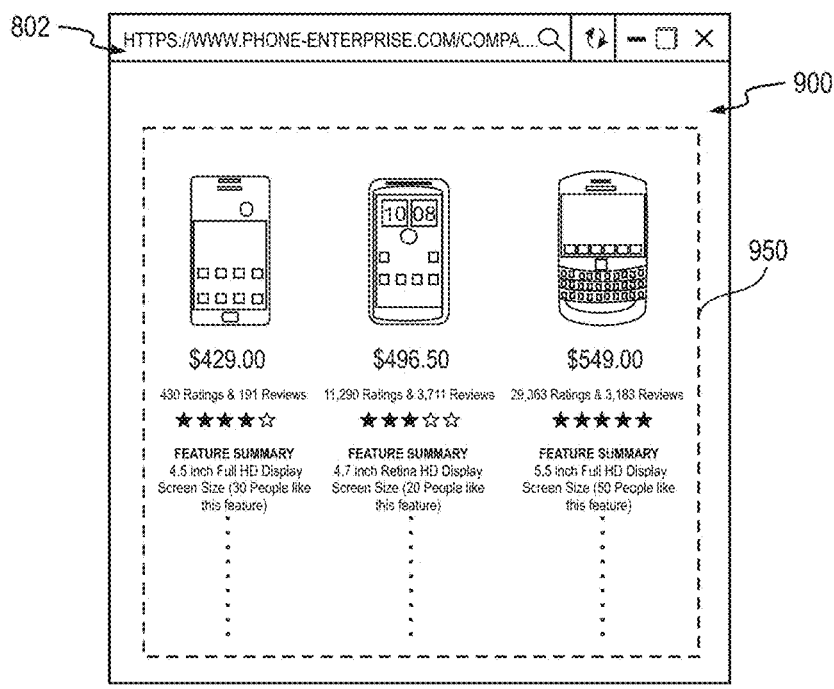
FIG. 9 shows a modified UI displayed to the user for illustrating engagement of a non-hot lead on an enterprise Website, in accordance with another example embodiment of the invention.

FIG. 9 shows a modified UI 900 displayed to the user for illustrating engagement of a non-hot lead on an enterprise Website 802 in accordance with another example embodiment of the invention. The UI 900 may be displayed on a display screen of an electronic device used by the user for accessing the enterprise Website 802. As shown, the UI 900 depicts a comparison 950 of the summary of attributes of similar phone models most likely of interest to the user. As explained above, the interaction engine 104 may receive the information related to the browsing activity of the user, and the analysis engine 101 of the apparatus 100 may determine that the user is a non-hot lead. Further, the analysis engine 101 may deduce an interest level of the user from the received information. The analysis engine 101 may further determine the likely interest of the user to be mobile phones (for example, based on mobile phone images clicked or web pages related to mobile phones checked by the user). Accordingly, the interaction engine 104 may display the UI 900 showing a comparison 950 of the summary of attributes of the phone to the user categorized as the non-hot lead.

As shown, the comparison 950 displayed to the user includes a comparison of attributes of three phone models. Furthermore, the comparison 950 depicts a comparison of the market prices, comparison of sentiments of users for corresponding phone models (for example, the first model has received 4.5 star rating, the second model has received three star rating, and the third model has received a five star rating), and comparison of sentiments related to individual attributes (for example, 30 people liked the attribute of 4.5 inch screen size in the first phone model and so on and so forth).

As explained above, displaying such a comparison 950 of the summary of attributes may increase an interest level of the user and the user, who may initially not be inclined to make a purchase, may upon viewing the comparison 950 explore more features of the phone models, and eventually may complete a purchase transaction during the current journey of the user on the enterprise Website 802.

In at least one example embodiment, modifying the UI includes causing a proactive display of an animated exchange of frequently asked questions (FAQs) between a user and an agent. More specifically, if the user is categorized as a non-hot lead, then the interaction engine 104 may be configured to cause display of presentation of dynamic and animated FAQs to engage the user. In at least one example embodiment, a Turing test based animation may be presented to the user to show the interaction between the user and the agent with animated exchange of FAQ's. If the user finds any FAQ to be asked, the user may click on that FAQ to facilitate user engagement in form of an interaction with an agent.

In at least one example embodiment, modifying the UI by the interaction engine 104 includes causing display of a gamification widget on the UI. Such a scenario is depicted in FIG. 10.

Figure 10:
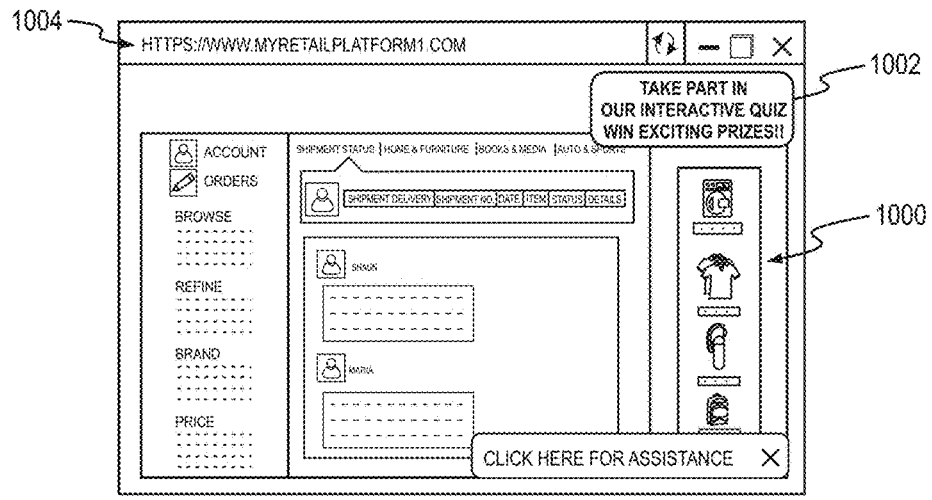
FIG. 10 shows a modified UI displaying a gamification widget to a user for illustrating engagement of a non-hot lead on an enterprise Website, in accordance with an example embodiment of the invention.

FIG. 10 shows modified UI 1000 displaying a gamification widget 1002 to a user for illustrating engagement of a non-hot lead on an enterprise Website in accordance with an example embodiment of the invention. As explained above, if the user is classified as a non-hot lead, the UI displayed to the user on the display screen of the electronic device is modified so as to facilitate conversion of the user from a purchasing entity to a non-purchasing entity. The modified UI 1000 displayed to the user includes the gamification widget 1002, which is configured to offer participation in an interactive game to the user to facilitate the user engagement. The gamification widget 1002 is configured to display text "TAKE PART IN AN INTERACTIVE QUIZ, WIN EXCITING PRIZES!!" In at least one example embodiment, the gamification widget 1002 is configured to be displayed substantially adjacent to a close option associated with UI 1002. In at least one example embodiment, the gamification widget 1002 is configured to, in response to a user selection input, cause display of a plurality of questions with corresponding multiple-choice answers.

Figure 11:
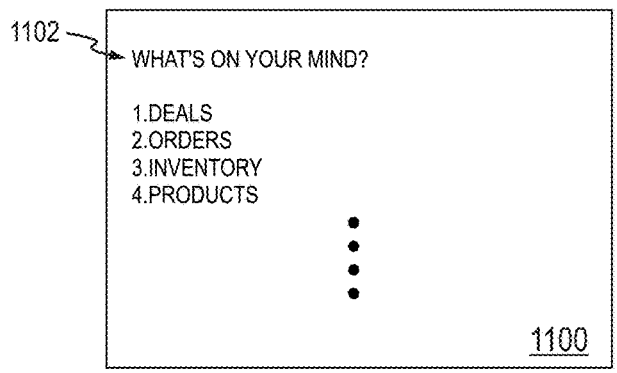
FIG. 11 shows a portion of a modified UI for illustrating a question displayed to a user, in accordance with an embodiment of the invention.
Figure 12:
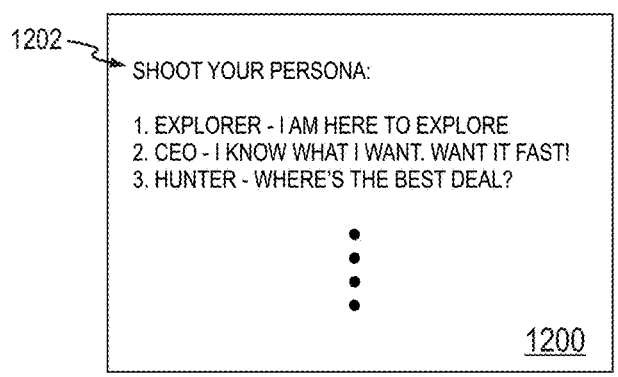
FIG. 12 shows a portion of a modified UI for illustrating a question displayed to a user, in accordance with another embodiment of the invention.

In at least one example embodiment, at least one question from among the plurality of questions corresponds to querying the user to choose a mood, a persona or an intention. Some illustrative examples of questions displayed to the user as part of an interactive game are depicted in FIGS. 11 and 12. More specifically, FIG. 11 shows a portion of a modified UI 1100 for illustrating a question 1102 displayed to a user in accordance with an embodiment of the invention. The question 1102 is intended to determine the user's intent. More specifically, the question 1102 asks the user to pick an answer for a query 'What's on your mind?' The multiple choices provided to the user to pick an answer includes choices such as deals, orders, inventory, and products. The user selection of an option may provide clues to guess the user's intention. Several such questions may be presented to the user as part of the interactive game. Each question may be associated with several answer options and the user may choose one option from among the plurality of options as an answer to a question. Another question provided to the user is depicted in FIG. 12. More specifically, FIG. 12 shows a portion of a modified UI 1200 for illustrating a question 1202 displayed to a user in accordance with another embodiment of the invention. The question 1202 is intended to determine the user's persona from among different persona types, such as an explorer persona type, a CEO persona type, a hunter persona type, and the like.

In some embodiments, a question from among the plurality of questions provided to the user as part of the interactive game may correspond to a query to pick a current mood from among a plurality of moods. In an illustrative example, the user may be asked to pick a mood from among eight states of mood associated with different personas. The examples of eight states of mood include sadness, anger, joy, surprise, fear, trust, disgust, and anticipation. In an embodiment, the interactive game may be configured to identify the current mood of the user. For example, the user may be asked to pick an animated icon from among a plurality of icons, where each icon may correspond to a mood from among the eight states of mood. For example, a handkerchief icon may correspond to sadness mood, a hammer icon may correspond to anger mood, a question mark icon may correspond a surprise mood, a coffin icon may correspond to a disgust mood, and so on and so forth. As explained above, several such questions may be presented to the user, as part of the interactive game, and each question may be associated with several answer options and the user may choose one option from among the plurality of options as an answer to a question.

In an embodiment, the interaction engine 104 is configured to offer at least one reward to the user as an incentive for participating in the interactive game. For example, a button displaying text 'Let's check out your reward' may be displayed to the user subsequent to completion of the interactive game. The user may provide a selection input on the button to receive a reward (such as for example, a discount coupon or a personalized agent assistance) for participating in the interactive game. Participating in the interactive game may improve an interaction experience of the user and the user may complete a purchase transaction during the current journey of the user on the Website. In some example scenarios, the user having participated in the interactive game may provide additional information about the user's preference, mood or intent, and based on such additional information, the UI may be modified to suit the user's preference, which may then increase the interest level of the user and facilitate conversion of the user from a non-purchasing entity to a purchasing entity. In some embodiments, modifying the UI by the interaction engine 104 includes causing display of an advertisement, a discount coupon or a promotional offer to the user. The advertisement, the discount coupon or the promotional offer may be displayed substantially adjacent to a close option of the UI.

A method for engaging users on enterprise interaction channels is explained with reference to FIGS. 13 and 14.

Figure 13:
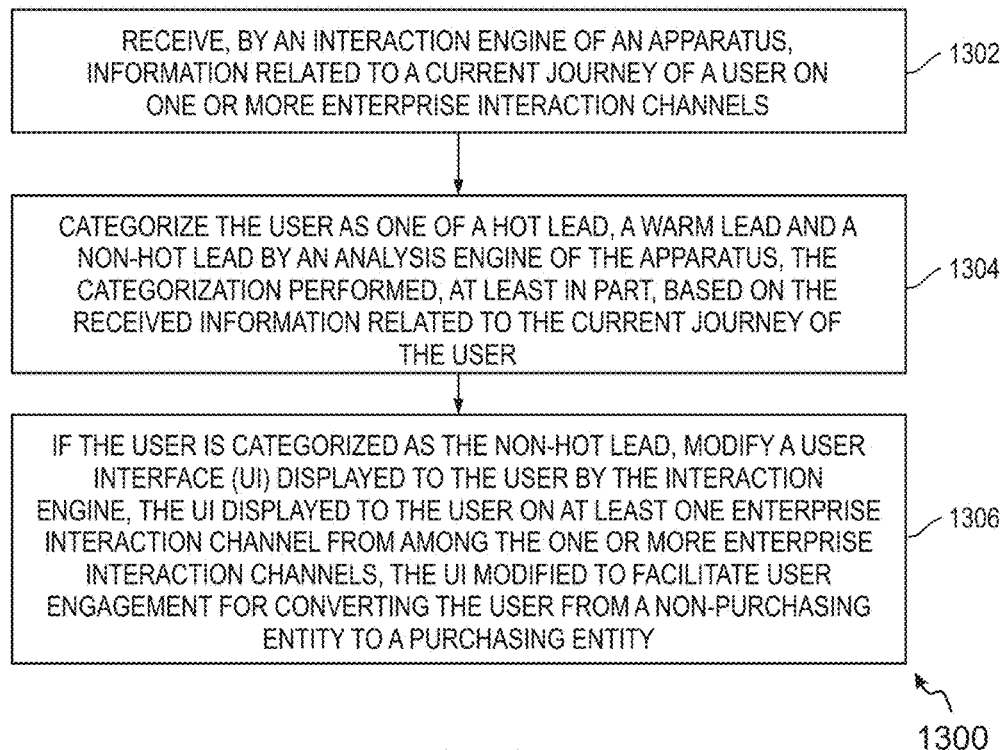
FIG. 13 is a flow diagram of an example method for engaging a user on an enterprise interaction channel, in accordance with an embodiment of the invention.

FIG. 13 is a flow diagram of an example method 1300 for engaging a user on an enterprise interaction channel in accordance with an embodiment of the invention. The method 1300 depicted in the flow diagram may be executed by, for example, the apparatus 100 explained with reference to FIGS. 1 to 12. Operations of the flowchart, and combinations of operation in the flowchart, may be implemented by, for example, hardware, firmware, a processor, circuitry, and/or a different device associated with the execution of software that includes one or more computer program instructions. The operations of the method 1300 are described herein with help of the apparatus 100. For example, one or more operations corresponding to the method 1300 may be executed by an analysis engine and an interaction engine, such as the analysis engine 101 and the interaction engine 104 of the apparatus 100, respectively. The operations of the method 1300 can be described and/or practiced by using an apparatus other than the apparatus 100. The method 1300 starts at operation 1302.

At operation 1302 of the method 1300 information related to a current journey of a user on one or more enterprise interaction channels is received by an interaction engine of an apparatus, such as the interaction engine 104 of the apparatus 100. For example, for a current journey of a user on an enterprise Website, the information received related to the current journey may include information such as Web pages visited, time spent on each Web page, time spent on the Website so far, operating system (OS) of the device used for accessing the Website, browser of the device used for accessing the Website, menu options accessed, drop-down options selected or clicked, mouse movements, hypertext mark-up language (HTML) links those which are clicked and those which are not clicked, focus events (for example, events during which the user has focused on a link/webpage for a more than a pre-determined amount of time), non-focus events (for example, choices the user did not make from information presented to the user (for examples, products not selected) or non-viewed content derived from scroll history of the visitor), touch events (for example, events involving a touch gesture on a touch-sensitive device such as a tablet), non-touch events, and the like. An enterprise may associate tags, such as HTML tags or JavaScript tags with the various elements of the Website, which may be invoked when the user clicks or selects a corresponding element on the enterprise Website. Alternatively, the enterprise may open up a socket connection to capture information related to user activity on its Website. In at least one example embodiment, the interaction engine may be communicably associated with Web servers hosting Web pages of the enterprise Website to receive such information related to the current journey of users, in substantially real-time.

At operation 1304 of the method 1300 the user is categorized as one of a hot lead, a warm lead, and a non-hot lead by an analysis engine of the apparatus, such as the analysis engine 101 of the apparatus 100. The categorization may be performed, at least in part, based on the received information related to the current journey of the user. As explained with reference to FIG. 8, in some embodiments, each user may be categorized as a hot lead, a warm lead, or a non-hot lead based on the received information related to the respective current journeys whereas, in at least one example embodiment, each user may be categorized as one of the hot lead, warm lead, or the non-hot lead based on the received information, as well as a pre-identified correlation between user categorizations and respective user journeys.

In an embodiment, the analysis engine may be configured to predict intention of the user to perform the categorization. The intention of the user may be predicted using the received information related to the current journey and any previous journeys of the user on the one or more enterprise interaction channels. More specifically, for user intention prediction purposes, the analysis engine may be configured to subject received information related to the current journey and any previous journeys to a set of structured and un-structured data analytical models including text mining and predictive models (hereinafter collectively referred to as prediction models). In at least one example embodiment of the invention, the prediction may be performed using a fuzzy logic based classifier. The use of a fuzzy-logic based classifier results in generation of output from the classifier, in form of scores on a scale of 0 to 1, which further enables categorization of users into broader ranges of categories. The prediction of user's intention using a fuzzy-logic based classifier and subsequent categorization of the user may be performed as explained above and is not explained again herein.

At operation 1306 of the method 1300 a user interface (UI) displayed to the user is modified by the interaction engine if the user is categorized as the non-hot lead. The UI is displayed to the user on at least one enterprise interaction channel from among the one or more enterprise interaction channels associated with the current journey of the user. The UI is modified to facilitate user engagement for converting the user from a non-purchasing entity to a purchasing entity. In an embodiment, modifying the UI includes causing display of summary of attributes of a good or a service most likely to be of interest to the user. An example UI displaying the summary of attributes is shown in FIG. 8. In an embodiment, modifying the UI may include causing display of a comparison of attributes of similar goods or services most likely to be of interest to the user. An example UI displaying the comparison of summary of attributes is shown in FIG. 9.

In at least one example embodiment, modifying the UI includes causing a proactive display of an animated exchange of frequently asked questions (FAQs) between a user and an agent. More specifically, if the user is categorized as a non-hot lead, then a display of presentation of dynamic and animated FAQs to engage the user may be caused. In another embodiment, modifying the UI by the interaction engine includes causing display of a gamification widget on the UI. Such a scenario is explained with reference to FIG. 10 and is not explained again. In at least one example embodiment, the gamification widget is configured to, in response to a user selection input, cause display of a plurality of questions with corresponding multiple-choice answers. In at least one example embodiment, at least one question from among the plurality of questions corresponds to querying the user to choose a mood, a persona, or an intention. Some illustrative examples of questions displayed to the user as part of an interactive game are depicted in FIGS. 11 and 12. In an embodiment, the interaction engine 104 is configured to offer at least one reward to the user as an incentive for participating in the interactive game. For example, a button displaying text 'Let's check out your reward' may be displayed to the user subsequent to completion of the interactive game. The user may provide a selection input on the button to receive a reward for participating in the interactive game. Participating in the interactive game may improve an interaction experience of the user and the user may complete a purchase transaction during the current journey of the user on the Website. In some example scenarios, the user having participated in the interactive game may provide additional information about the user's preference, mood, or intent and, based on such additional information, the UI may be modified to suit the user's preference, which may then increase the interest level of the user and facilitate conversion of the user from a non-purchasing entity to a purchasing entity. In some embodiments, modifying the UI includes causing display of an advertisement, a discount coupon or a promotional offer to the user.

Another method for engaging users on enterprise interaction channels is explained with reference to FIG. 14.

Figure 14:
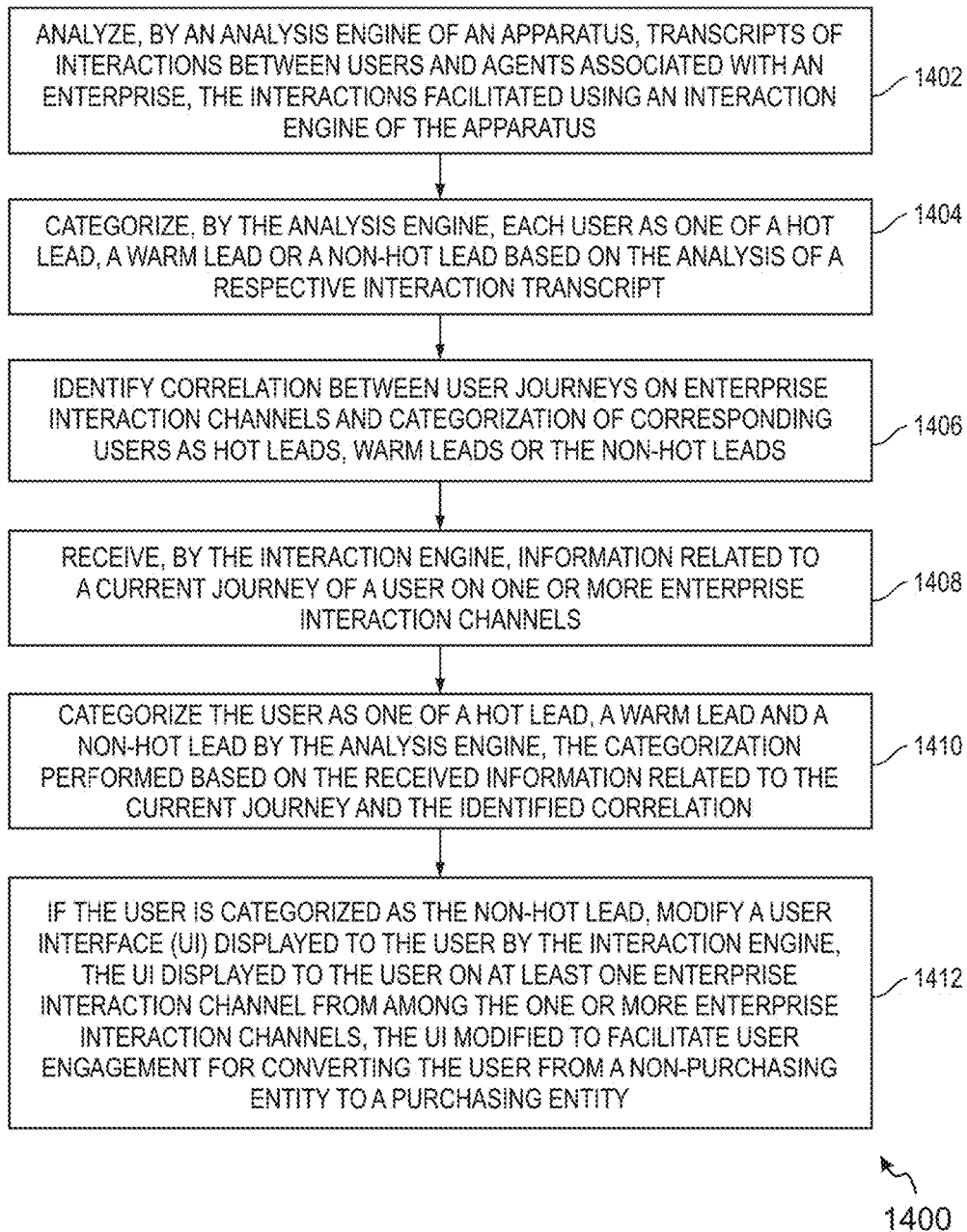
FIG. 14 is a flow diagram of an example method for engaging a user on an enterprise interaction channel, in accordance with another embodiment of the invention.

FIG. 14 is a flow diagram of an example method 1400 for engaging a user on an enterprise interaction channel in accordance with another embodiment of the invention. The method 1400 depicted in the flow diagram may be executed by, for example, the apparatus 100 explained with reference to FIGS. 1 to 12. Operations of the flowchart, and combinations of operation in the flowchart, may be implemented by, for example, hardware, firmware, a processor, circuitry and/or a different device associated with the execution of software that includes one or more computer program instructions.

At operation 1402 of the method 1400 transcripts of interactions between users and agents associated with an enterprise are analyzed by an analysis engine of an apparatus, such as the analysis engine 101 of the apparatus 100. In at least one example embodiment, the interactions are facilitated using an interaction engine of the apparatus, such as the interaction engine 104 of the apparatus 100. At operation 1404 of the method 1400 each user is categorized as one of a hot lead, a warm lead, or a non-hot lead by the analysis engine based on the analysis of a respective interaction transcript. The analysis of the interaction transcript and the subsequent user categorization may be performed as explained with reference to FIGS. 1 to 7 and is not explained again, herein.

At operation 1406 of the method 1400, correlation between user journeys on enterprise interaction channels is identified and categorization of corresponding users as hot leads, warm leads, or the non-hot leads is performed.

At operation 1408 of the method 1400, information related to a current journey of a user on one or more enterprise interaction channels is received by the interaction engine. The reception of information related to the user's current journey may be performed as explained with reference to operation 1302 and is not explained again herein.

At operation 1410 of the method 1400 the user is categorized as one of a hot lead, a warm lead, and a non-hot lead by the analysis engine. The categorization is performed based on the received information related to the current journey and the identified correlation. For example, if a user is categorized as a non-hot lead based on the score associated with a respective transcript, and the user performed a certain journey on the Website, then the analysis engine may be configured to store the user journey along with the categorization information of the user.

Storing of user journeys along with categorization information may be performed for each user classified as a hot lead, a warm lead, and a non-hot lead. The analysis engine may then be configured to identify a correlation between a user journey and a categorization of a user as one of a hot lead, a warm lead, and a non-hot lead. For example, based on analyzing several Web journeys and corresponding user categorizations, the analysis engine may identify a correlation between a sequence of Web page visits and the categorization of the user as a warm lead. The analysis engine may be configured to store the identified correlation between the Web page visit sequence and the subsequent categorization of the user as the warm lead. Accordingly, if the received information related to a current journey of a new user to the enterprise Website suggests that the user has visited the same sequence of Web pages, then the user may be classified as a warm lead. Accordingly, for each user currently present of the enterprise interaction channel, the analysis engine may be configured to determine the respective current journey attributes and use the stored correlation to categorize the user as one of the hot lead, the warm lead, and the non-hot lead based on the received information related to the current journey and the identified correlation.

At operation 1412 of the method 1400 a user interface (UI) displayed to the user is modified by the interaction engine if the user is categorized as the non-hot lead. The UI is displayed to the user on at least one enterprise interaction channel from among the one or more enterprise interaction channels. The modification of the UI may be performed as explained with reference to FIGS. 8 to 12. The UI is modified to facilitate conversion of the user from a non-purchasing entity to a purchasing entity.

Computer Implementation

The embodiments disclosed herein can be implemented through at least one software program running on at least one hardware device and performing network management functions to control the network elements. The network elements shown in FIGS. 1 and 2 include blocks, which can be at least one of a hardware device, or a combination of hardware device and software module.

Figure 15:
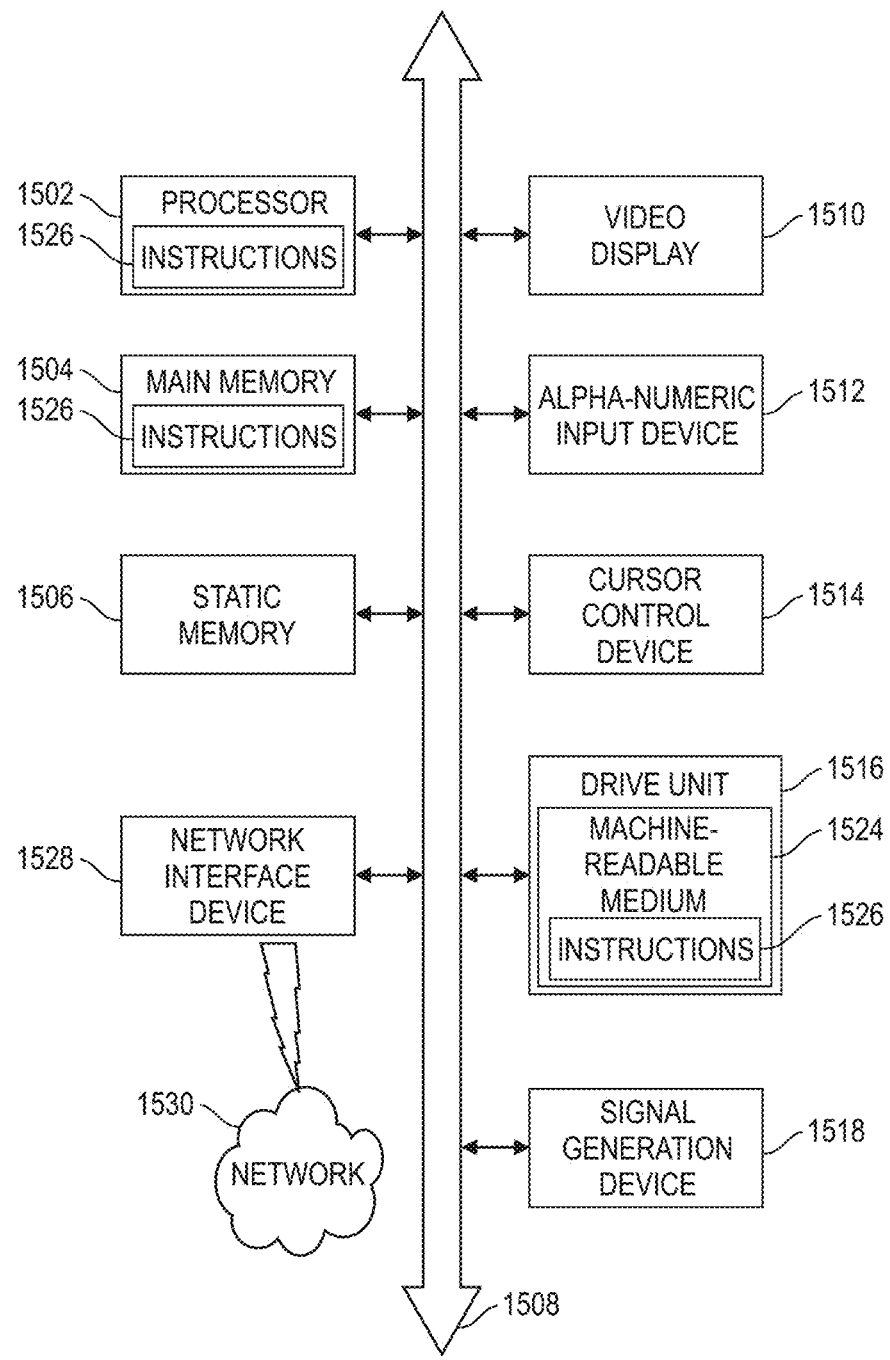
FIG. 15 is a block schematic diagram that depicts a machine in the exemplary form of a computer system within which a set of instructions for causing the machine to perform any of the herein disclosed methodologies may be executed.

FIG. 15 is a block schematic diagram that depicts a machine in the exemplary form of a computer system 1500 within which a set of instructions for causing the machine to perform any of the herein disclosed methodologies may be executed. In alternative embodiments, the machine may comprise or include a network router, a network switch, a network bridge, personal digital assistant, a cellular telephone, a Web appliance, or any machine capable of executing or transmitting a sequence of instructions that specify actions to be taken.

The computer system 1500 includes a processor 1502, a main memory 1504 and a static memory 1506, which communicate with each other via a bus 1508. The computer system 1500 may further include a display unit 1510, for example, a liquid crystal display (LCD). The computer system 1500 also includes an alphanumeric input device 1512, for example, a keyboard; a cursor control device 1514, for example, a mouse; a disk drive unit 1516, a signal generation device 1518, for example, a speaker, and a network interface device 1528.

The disk drive unit 1516 includes a machine-readable medium 1524 on which is stored a set of executable instructions, i.e. software, 1526 embodying any one, or all, of the methodologies described herein below. The software 1526 is also shown to reside, completely or at least partially, within the main memory 1504 and/or within the processor 1502. The software 1526 may further be transmitted or received over a network 1530 by means of a network interface device 1528.

In contrast to the system 1500 discussed above, a different embodiment uses logic circuitry instead of computer-executed instructions to implement processing entities. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

Embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine-readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Various embodiments disclosed herein provide numerous advantages. More specifically, the various embodiments disclose methods and apparatuses for engaging users on enterprise interaction channels. The techniques disclosed herein suggest categorizing the pool of users into hot leads, warm leads, and non-hot leads using fuzzy logic to drive more opportunity for sales. The use of a fuzzy-logic based classifier, instead of a binary classifier, enables categorization of users into broader ranges of categories as opposed to user categorization using stringently applied boundaries. Moreover, techniques are disclosed to engage the warm leads and non-hot leads, who are generally ignored for proactive engagement, and who constitute a substantially higher percentage of the overall pool of users. Engagement of the non-hot leads, especially may drive up sales for an enterprise. The non-hot leads may also be engaged with for other purposes such as, for collecting data that could further improve the accuracy targeting models and drive higher sales.

The disclosed methods 600, 1300, and 1400 may be implemented using software including computer-executable instructions stored on one or more computer-readable media (e.g. non-transitory computer-readable media, such as one or more optical media discs, volatile memory components (e.g. DRAM or SRAM), or nonvolatile memory or storage components (e.g. hard drives or solid-state nonvolatile memory components, such as Flash memory components) and executed on a computer (e.g. any suitable computer or image processor embedded in a device, such as a laptop computer, net book, web book, tablet computing device, smart phone, or other mobile computing device). Such software may be executed, for example, on a single local computer or in a network environment (e.g. via the Internet, a wide-area network, a local-area network, a remote Web-based server, a client-server network (such as a cloud computing network or other such network) using one or more network computers. Additionally, any of the intermediate or final data created and used during implementation of the disclosed methods or systems may also be stored on one or more computer-readable media (e.g. non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc. described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry, and/or in Digital Signal Processor (DSP) circuitry).

Particularly, the apparatus 100, the interaction engine 104, the analysis engine 101 and its various constituents may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations (for example, operations explained herein with reference to FIGS. 6, 13 and 14). A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers), or a wireless communication line.

Various embodiments of the invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claimed invention.

The invention claimed is:

1. A computer-implemented method, comprising:
receiving, by an interaction engine of an apparatus, information related to a current journey of a user on one or more enterprise interaction channels;

predicting, by an analysis engine, an intention of the user by processing the information using a fuzzy logic based classifier;

categorizing, by the analysis engine, the user as one of a hot lead, a warm lead, and a non-hot lead based, at least in part, on the predicted intention of the user; and when the user is categorized as the non-hot lead, modifying a user interface (UI) displayed to the user by the interaction engine, the UI displayed to the user on at least one enterprise interaction channel from among the one or more enterprise interaction channels, the UI modified to facilitate user engagement for converting the user from a non-purchasing entity to a purchasing entity.

2. The method of claim 1, wherein modifying the UI includes:
  causing display in the UI of one of:
    a summary of attributes of a good or a service most likely to be of interest to the user; and
    a comparison of attributes of similar goods or services most likely to be of interest to the user.

3. The method of claim 2, wherein the comparison of attributes comprises at least one of:
  comparison of sentiments associated with the similar goods or services;
  comparison of sentiments associated with individual attributes of the similar goods or services; and
  comparison of market prices of the similar goods or services.

4. The method of claim 1, wherein modifying the UI includes:
  causing display of an exchange of frequently asked questions (FAQs) to facilitate the user engagement.

5. The method of claim 1, wherein modifying the UI includes:
  causing display of a gamification widget in the UI, the gamification widget configured to offer participation in an interactive game to the user to facilitate the user engagement.

6. The method of claim 5, wherein offering participation in the interactive game includes:
  response to a user selection input, causing display, buy the gamification widget, of a plurality of questions with corresponding multiple-choice answers and, wherein at least one question from among the plurality of questions corresponds to querying the user to choose a mood, a persona or an intention.

7. The method of claim 5, further comprising:
  offering, by the interaction engine, at least one reward to the user as an incentive for participating in the interactive game.

8. The method of claim 1, wherein modifying the UI includes:
  causing display of at least one of an advertisement, a discount coupon, and a promotional offer to the user to facilitate the user engagement.

9. The method of claim 1, further comprising:
  analyzing, by the analysis engine, transcripts of interactions between users and agents associated with an enterprise, the interactions facilitated using the interaction engine of the apparatus;
  categorizing each user from among the users, by the analysis engine, as the hot lead, the warm lead, or the non-hot lead based on the analysis of a respective interaction transcript; and
  identifying, by the analysis engine, correlation between user journeys on enterprise interaction channels and categorization of corresponding users as the hot leads, the warm leads or the non-hot leads.

10. The method of claim 1, further comprising:
  when the user is categorized as the warm lead, targeting the user using offline email campaigns to facilitate conversion of the user from a user who is mildly interested in a good or a service into a user who actually purchases the good or the service.

11. An apparatus, comprising:
  an interaction engine configured to receive information related to a current journey of a user on one or more enterprise interaction channels; and
  an analysis engine communicably associated with the interaction engine, the analysis engine configured to process the information using a fuzzy logic based classifier to predict and intention of the user and categorize the user as one of a hot lead, a warm lead, and a non-hot lead, based, at least in part, on the predicted intention of the user, wherein when the user is categorized as the non-hot lead, the interaction engine modifies a user interface (UI) displayed to the user on at least one enterprise interaction channel from among the one or more enterprise interaction channels, the UI modified to facilitate user engagement for converting the user from a non-purchasing entity to a purchasing entity.

12. The apparatus of claim 11, wherein for modifying the UI, the interaction engine causes display in the UI of one of:
  a summary of attributes of a good or a service most likely to be of interest to the user; and
  a comparison of attributes of similar goods or services most likely to be of interest to the user.

13. The apparatus of claim 11, wherein for modifying the UI, the interaction engine causes display of an exchange of frequently asked questions (FAQs) to facilitate the user engagement.

14. The apparatus of claim 11, wherein for modifying the UI, the interaction engine causes display of a gamification widget on the UI, the gamification widget configured to offer participation in an interactive game to the user to facilitate the user engagement.

15. The apparatus of claim 14, wherein the gamification widget, in response to a user selection input, causes display of a plurality of questions with corresponding multiple-choice answers and, wherein at least one question from among the plurality of questions corresponds to querying the user to choose a mood, a persona or an intention.

16. The apparatus of claim 14, wherein the interaction engine offers at least one reward to the user as an incentive for participating in the interactive game.

17. The apparatus of claim 11, wherein for modifying the UI, the interaction engine causes display of at least one of an advertisement, a discount coupon and a promotional offer to the user to facilitate the user engagement.

18. The apparatus of claim 11, wherein the analysis engine:
  analyses transcripts of interactions between users and agents associated with an enterprise, the interactions facilitated using the interaction engine;
  categorizes each user as the hot lead, the warm lead or the non-hot lead based on the analysis of a respective interaction transcript; and
  identifies correlation between user journeys on enterprise interaction channels and categorization of corresponding users as the hot leads, the warm leads or the non-hot leads, wherein the user is classified as one of the hot lead, the warm lead, and the non-hot lead based on the received information related to the current journey and the identified correlation.

19. The apparatus of claim 11, wherein if the user is categorized as the warm lead, the interaction engine causes targeting of the user using offline email campaigns to facilitate conversion of the user from a user who is mildly interested in a good or a service into a user who actually purchases the good or the service.

20. A computer-implemented method, comprising:
analyzing, by an analysis engine of an apparatus, transcripts of interactions between previous users and agents associated with an enterprise, the interactions facilitated using an interaction engine of the apparatus;
categorizing, by the analysis engine, each of the previous user as one of a hot lead, a warm lead, or a non-hot lead based on the analysis of a respective interaction transcript;
identifying correlations between user journeys associated with each of the previous users on enterprise interaction channels and categorization of corresponding previous users as hot leads, warm leads, or the non-hot leads;
receiving, by the interaction engine, information related to a current journey of a user on one or more enterprise interaction channels;
categorizing the user as one of a hot lead, a warm lead, and a non-hot lead by the analysis engine, the categorization performed based on the received information related to the current journey and the identified correlations; and
when the user is categorized as the non-hot lead, modifying a user interface (UI) displayed to the user by the interaction engine, the UI displayed to the user on at least one enterprise interaction channel from among the one or more enterprise interaction channels, the UI modified to facilitate user engagement for converting the user from a non-purchasing entity to a purchasing entity.

21. The method of claim 20, wherein modifying the UI includes:
causing display in the UI of one of:
a summary of attributes of a good or a service most likely to be of interest to the user; and
a comparison of attributes of similar goods or services most likely to be of interest to the user.

22. The method of claim 20,
wherein the transcripts of interactions are analyzed using a fuzzy logic based classifier to categorize each of the previous users into one of the hot lead, the warm lead, and the non-hot lead.

23. The method of claim 20, wherein modifying the UI includes:
causing display of a gamification widget in the UI, the gamification widget configured to offer participation in an interactive game to the user to facilitate the user engagement.

24. The method of claim 23, wherein offering participation in the interactive game includes:
in response to a user selection input, causing display, by the gamification widget, of a plurality of questions with corresponding multiple-choice answers and, wherein at least one question from among the plurality of questions corresponds to querying the user to choose a mood, a persona or an intention.

25. The method of claim 23, further comprising:
offering, by the interaction engine, at least one reward to the user as an incentive for participating in the interactive game.

26. The method of claim 20, further comprising:
when the user is categorized as the warm lead, the user is targeted using offline email campaigns to facilitate conversion of the user from a user who is mildly interested in a good or a service into a user who actually purchases the good or the service.

* * * * *